United States Patent
Hori

[11] 3,889,785
[45] June 17, 1975

[54] DISC BRAKE UNIT
[76] Inventor: Toshio Hori, 1009-2 Ohoza Lokiie, Ueda, Japan
[22] Filed: Feb. 13, 1974
[21] Appl. No.: 442,149

[30] Foreign Application Priority Data
Feb. 16, 1973 Japan.............................. 48-18345

[52] U.S. Cl............................... 188/73.3; 188/72.4
[51] Int. Cl...................... F16d 55/224; F16d 65/02
[58] Field of Search................... 188/73.3, 72.4, 370

[56] References Cited
UNITED STATES PATENTS
3,166,159  1/1965  Burnett............................. 188/73.3
3,361,229  1/1968  Swift.................................. 188/72.4
3,421,603  1/1969  Schuchmann et al. ............ 188/72.4
3,661,231  5/1972  Beller et al. ....................... 188/72.4

Primary Examiner—George E. A. Halvosa

[57] ABSTRACT

A disc brake unit of the so-called caliper slide type, in which the caliper structure is slidably supported characteristically by a bearing sleeve mounted on a fixed frame within the confines of the caliper structure itself closely to the friction pads thereon. The caliper structure is smoothly slidable with reduced torsional load to which it is subjected upon brake engagement. Reduction in braking effect resulting from lack of smoothness in operation and uneven wear of the friction pads can be avoided effectively.

1 Claim, 2 Drawing Figures

DISC BRAKE UNIT

BACKGROUND OF THE INVENTION

This invention relates generally to disc brake units and more particularly to those of the caliper slide type or the type including a caliper structure provided with a pair of friction pads to clamp a brake disc therebetween and adapted to be slidably supported on an appropriate fixed frame. As is well known, in this type of disc brake unit, the caliper structure is caused to slide as one of the friction pads is pressed against the adjacent face of the brake disc by means of an appropriate thrust mechanism in a direction to bring the other friction pad into pressure engagement with the other face of the brake disc in reaction to the pressure of thrust exerted on said one of the friction pads.

In previous forms of such type of disc brake unit, however, the slidable support of the caliper structure on a fixed frame has been effected outside of the caliper structure by way of a bearing formation thereon and naturally at a considerably large distance from the friction pads.

With such arrangement, the caliper structure must be subjected upon brake engagement to a substantial torsional load and has often lacked smoothness in sliding movement. In extreme cases, this has resulted in substantial reduction in braking effect and localized, uneven wear of the friction pads.

SUMMARY OF THE INVENTION

The present invention is intended to overcome such difficulties previously met with disc brake units of the type described and provides a novel disc brake unit of the same general type in which a caliper structure carrying a pair of friction pads is slidably supported by bearing means arranged adjacent to the friction pads thereby to minimize the torsional load to which the caliper structure is subjected upon brake engagement. Owing to this arrangement, the caliper structure of the disc brake unit of the present invention can slide with extreme smoothness and the difficulties previously experienced with the same type of disc brake unit are successfully avoided.

The present invention will next be described in more detail with reference to the accompanying drawing.

BRIEF DESCRIPTION OF THE DRAWING

In the drawing, which illustrates one preferred embodiment of the present invention.

DESCRIPTION OF THE PREFERRED EMBODIMENT

Figure 1:
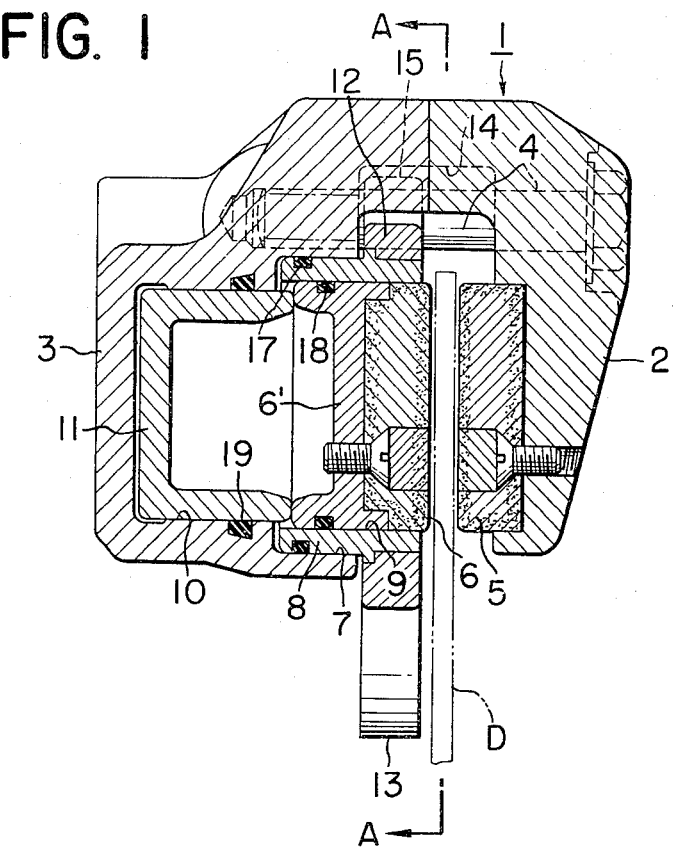
FIG. 1 is a longitudinal cross-sectional view of a disc brake unit embodying the present invention.
Figure 2:
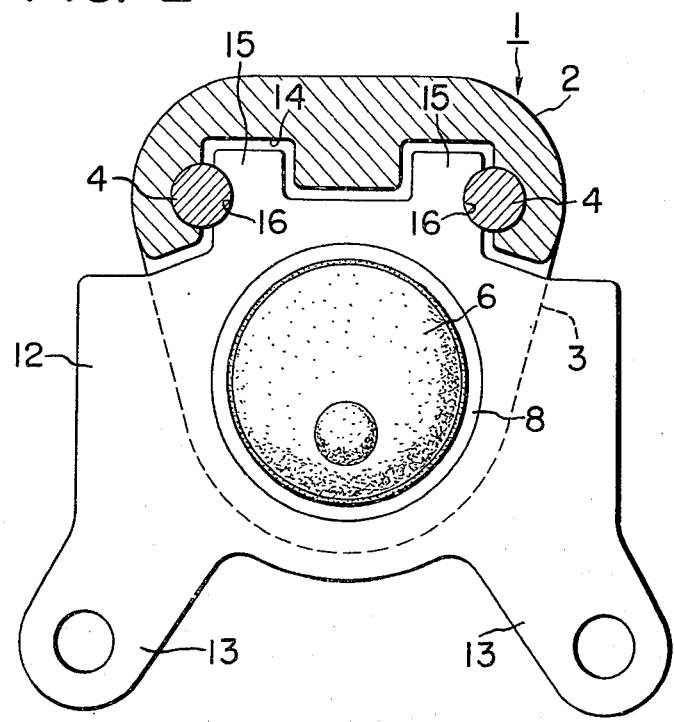
FIG. 2 is a cross-sectional view taken along the line A—A in FIG. 1.

In the drawing, in which one form of disc brake unit for use on a vehicle is illustrated, reference character D indicates a brake disc secured to a vehicle wheel, not shown; and refrnce numeral 1 indicates a caliper structure including a pair of right and left caliper arms 2 and 3 spaced opposite to each other and arranged in straddling relation to the brake disc D. The caliper arms 2 and 3 are joined together at the base end thereof by a pair of bolts 4, 4, which extend parallel to the axis of brake disc D.

One of the caliper arms, 2, carries on its inside a first friction pad 5 in facing relation to the adjacent face of the brake disc D and the other caliper arm 3 is formed inside thereof with a cylindrical guide bore 7, in which a cylindrical bearing sleeve 8 is slidably fitted. Reference numeral 6 indicates a second friction pad integrally secured to a pad support disc 6', which is slidably fitted in the bore 9 of the bearing sleeve 8 with the second friction pad 6 facing the other face of the brake disc D.

Also formed in the caliper arm 3 is an oil hydraulic cylinder bore 10 opening at the bottom of the guide bore 7, and having an internal diameter slightly smaller than the internal diameter of the cylindrial bearing sleeve 8. Accommodated in the oil hydraulic cylinder bore 10 is a piston member 11 adapted to act upon the back of the pad support disc 6'. It is to be understood that the oil hydraulic cylinder 10 connected with a known form of brake master cylinder, not shown.

The bearing sleeve 8 extends at one end beyond the inside surface of the associated caliper arm 3 and a bracket plate 12 is secured to the extended sleeve portion integrally therewith. The bracket plate 12 is formed around the periphery thereof with a pair of radially outwardly extending integral arms 13, 13, which are fixed to an appropriate fixed structure, not shown, of the vehicle, and also a pair of engaging projections 15, 15, which extend substantially in parallel with each other into respective recesses 14, 14 formed in the base portion of the caliper structure 1 so as to expose half the periphery of the medial portions of respective joining bolts 4, 4. As shown, the engaging projections 15, 15 are each formed on its outside with an arcuate slot 16 for sliding engagement with the exposed section of the adjacent joining bolt 4. In FIG. 1, reference numerals 17 and 18 both indicate a water- and dust-seal ring; and reference numeral 19 indicates an oil seal ring.

In operation, when the oil hydraulic cylinder 10 is supplied with pressure oil from a brake master cylinder, not shown, the piston 11 is driven to the right, as viewed in FIG. 1, to press the second friction pad 6 against the adjacent fase of the rotating brake disc D and, in reaction to this, the caliper structure 1 is moved to the left to press the friction pad 5, carried on the caliper arm 2, against the adjacent face of the brake disc D, sliding movement occurring between the cylindrical wall of guide bore 7 and bearing sleeve 8 and between the respective engaging projections 15, 15 and joining bolts 4, 4. As will readily be understood, the force of pressure acting between the first friction pad 5 and brake disc D is held in balance with that acting between the second friction pad 6 and brake disc D. In other words, the brake disc D is caused to stop rotation under the frictional forces of the same magnitude occurring on the opposite faces thereof under the action of the respective friction pads 5 and 6. On this occasion, part of the entire braking force is transmitted through the first friction pad 5 and caliper arms 2, 3 to the bearing sleeve 8 the remaining braking force being transmitted to the bearing sleeve 8 directly from the second friction pad 6, and in this manner the braking force is sustained as a whole by the carrying the bearing sleeve 8. In this connection, it is to be noted that the engaging projections 15, 15 act to restrain rotation of the caliper structure 1 about the bearing sleeve 8 through the medium of joining bolts 4, 4, with which the projections 15, 15 are in slidable engagement, and sustain a portion of the braking force transmitted through the first friction pad 5.

To summarize, the caliper structure 1 of the disc brake unit of the present invention is slidably supported by a bearing sleeve 8 in which one of the friction pads, 6, operable under the control of an appropriate thrust mechanism including, for example, an oil hydraulic piston 11, is slidably fitted so that the braking force exerted by the friction pad 6 is sustained directly by the bearing sleeve 8. With such arrangement, the torsional load which the caliper structure 1 undergoes upon engagement of the brake unit is reduced by half in magnitude so that the structure 1 can slide very smoothly along the bearing sleeve 8, ensuring that the engaging pressures and hence frictional resistances of the two friction pads 5 and 6 against the rotating brake disc D are well balanced to give a satisfactory braking effect thereon and uneven wear, if any, of the working faces of the friction pads 5 and 6 is materially reduced.

While the invention has been disclosed in connection with a certain specific embodiment thereof, it will be obvious to those skilled in the art that it is not so limited by susceptible of verious changes and modifications without departing from the spirit of the invention or from the scope of the appended claim.

What is claimed is:

1. A disc brake unit comprising: a brake disc secured to a rotating member; caliper means having a pair of caliper arms spaced opposite to each other and arranged in straddling relation to said brake disc, said caliper arms being interconnected at their basal ends by means of joining bolts extending parallel to an axis of said brake disc, said bolts being exposed at their medial portions to a space defined by said caliper arms; a first friction pad mounted on one of said caliper arms on the inside thereof and facing one face of said brake disc; a bearing sleeve slidably fitted in the other caliper arm on the inside thereof; a second friction pad slidably fitted in said bearing sleeve to face the other face of said brake disc; a bracket plate formed at the outer end of said bearing sleeve and integrally therewith, said bracket plate being slidably engageable with the exposed medial portions of said joining bolts; a fixed frame, said bracket being attachable to said fixed frame; and thrust means including a hydraulic cylinder bore formed within one of said caliper arms substantially in coaxial relation with said bearing sleeve, and a piston member slidably in said cylinder bore so as to drive said second friction pad into pressure engagement with said brake disc free of contact with the inner surface of said sleeve.

* * * * *